Patented July 3, 1951

2,559,071

UNITED STATES PATENT OFFICE 2,559,071

MONOFUEL

John A. Hannum, Detroit, Mich., assignor, by mesne assignments, to Borg-Warner Corporation, Chicago, Ill., a corporation of Illinois No Drawing. Application April 5, 1948,
Serial No. 19,171

4 Claims. (Cl. 52—5)

This invention relates to a prime mover propellant in which at least part of the oxygen required for combustion is contained at normal pressures in far more concentrated form than is found in ordinary fuel mixtures and more particularly to such a propellant embodying an inhibitor to slow the rate of flame propagation through the mixture.

Such a propellant may be efficiently used for various purposes including use as a source of power for prime movers and more specifically such prime movers as gas turbines and reciprocating internal combustion engines. Gas turbines heretofore have been subject to a marked disadvantage in that it has been necessary to provide a compressor as an integral part of the unit in order that the requisite amount of oxygen might be made available for combustion of the fuel. The use of such a compressor decreases the overall operating efficiency and greatly increases the volume and weight of gas turbine installations. The fact that gas turbines in the past have derived their oxygen from the atmosphere imposed a marked ceiling limitation on aircraft driven by them because the atmosphere becomes more rarified as the altitude increases and has less available oxygen.

If a gas turbine could be provided with a suitable fuel which eliminated the foregoing disadvantages, its field of application would be considerably broadened. Fields in which it now has utility would be expanded and other fields in which its use is not now practical would be opened. At the present time gas turbines have found some use as stationary auxiliary equipment in power plants, and to a limited extent have been considered for use in driving railway locomotives. All of these uses would be expanded if the foregoing objections to the gas turbine as it now stands and to the fuel available for its use could be eliminated.

Although a prime use of the propellant described herein is for gas turbines, it will be understood that it is susceptible to a wide variety of other uses. It may, for instance, be used in a reciprocating internal combustion engine and it may be used under a variety of circumstances as in aircraft, underwater craft, land vehicles and stationary installations. It can be used as a source of power for rockets in which both the fuel and oxygen are carried by the projectile. It also is useful in driving ram jets, particularly at high altitudes where the rarified air offers little oxygen to support combustion and where the maintenance of a suitable flame front is difficult. It can be used in many other situations either alone or in combination with other materials where the burning of a self-sufficient fuel or propellant is desired to make available heat energy or gas pressure due to combustion.

It is an object of the present invention to provide a propellant as outlined above which combines fuel, oxygen in combined form in sufficient quantity to cause complete combustion of substantially all the fuel, and an inhibitor to reduce the rate of flame propagation through the fuel-oxidant mixture. A further object of the invention is to provide an improved propellant comprising a fuel corresponding to the general formula $C_nH_{2n-6}$, tetranitromethane, and an inhibitor selected from the group consisting of alkyl and aryl derivatives of heavy metals. Other objects of the invention will become apparent from the following specification.

I have found that an excellent source of oxygen in combined form for use with a propellant fuel is tetranitromethane, $C(NO_2)_4$. This compound not only has ample available oxygen but also is miscible in almost all proportions with fuels that I contemplate using. The tetranitromethane is mixed in proper proportions, calculated hereafter on a weight basis, to assure substantially complete combustion of the mixture. Ideally it would be preferred to so exactly proportion the mixture that complete combustion is attained.

The fuels used with the propellant that forms the present invention are of the class known as unsaturated organic liquids of the series with the general formula $C_nH_{2n-6}$ as used in Conant's "The Chemistry of Organic Compounds," published by The Macmillan Company, New York, N. Y. For the purposes of this invention a liquid is defined as having a boiling point no lower than 15° C. or a melting point no higher than 50° C. A preferred example of such fuel is benzene, $C_6H_6$. Fuels of this group and tetranitromethane may be mixed in direct proportion to their atomic weights and the number of molecules called for in their reaction formulae to provide stoichiometric mixtures burning to water, carbon dioxide, and nitrogen. In so far as practical, the mixture should be as close as possible to these calculated values although considerable latitude is possible in this regard as set forth below.

When tetranitromethane and a fuel as identified above are burned alone the reaction is too violent for the purposes to which I propose that my invention be put. The combustion evidenced by the rate of flame propagation is so violent that the mixture is more properly termed an explosive than a fuel. To slow down the rate of flame propagation, an inhibitor is added to make up the complete mixture, the inhibitor being a material from the group consisting of alkyl and aryl derivatives of heavy metals of which specific examples are tetraphenyl tin, tetraethyl lead and triphenyl bismuthine. The inhibitor constitutes a very small part by weight of the total mixture, making up substantially one per cent (1%), and preferably less, of the propellant. Its presence slows down the rate of combustion of the mixture to make it a propellant, as distinguished from an explosive, suitable for the intended purpose.

As described above and as set forth in the claims, the propellant of my invention comprises fuel as identified, tetranitromethane and an inhibitor. It is contemplated that one or more materials from the group $C_nH_{2n-6}$ may be mixed together in such a propellant and likewise that one or more materials from the group consisting of alkyl and aryl derivatives of heavy metals may be present in the inhibitor part of the propellant. Furthermore the complete propellant need not be used alone for the intended purposes but may be a part of a mixture including other materials, as for instance water as a diluent.

A complete mixture in accord with my invention would, under precise conditions, contain exactly calculated weights of the ingredients as set out above. However I consider as coming within the scope of my invention the following proportions by weight mixed to make up the complete propellant:

Tetranitromethane ____ 84% to 87% by weight
Inhibitor _____ 1% to a trace by weight
Fuel with the formula
  $C_nH_{2n-6}$_____ Balance A somewhat greater range of tetranitromethane is permissible and results in a mixture that I likewise consider as within the scope of my invention. Such mixtures fall into the following ranges of percentages by weight:

Tetranitromethane ____ 80% to 90% by weight
Inhibitor _____ 1% to a trace by weight
Fuel with the formula
  $C_nH_{2n-6}$_____ Balance The mixtures to which reference is made in the foregoing paragraphs are those which obtain in that region in which the propellant is conditioned for combustion.

From the foregoing description it will be seen that I have provided a prime mover propellant that may be self contained to any desired degree as far as fuel and oxygen are concerned and that is safe to handle with a controlled rate of combustion or flame propagation. This application for patent is a continuation in part of prior application Serial No. 593,092, filed May 10, 1945, for "Propellant," now abandoned.

I claim:

1. A propellant comprising a mixture of approximately eighty to ninety percent by weight of tetranitromethane as an oxidizing agent, less than one percent by weight but more than a trace of material from the group consisting of triphenyl bismuthine, tetraphenyl tin, and tetraethyl lead as an inhibitor to control the rate of combustion, and the balance an unsaturated organic liquid fuel of the series with the general formula $C_nH_{2n-6}$.

2. A propellant comprising a mixture of approximately eighty to ninety percent by weight of tetranitromethane as an oxidizing agent, less than one percent by weight but more than a trace of tetraphenyl tin as an inhibitor to control the rate of combustion, and the balance an unsaturated organic liquid fuel of the series with the general formula $C_nH_{2n-6}$.

3. A propellant comprising a mixture of approximately eighty to ninety percent by weight of tetranitromethane as an oxidizing agent, less than one percent by weight but more than a trace of tetraethyl lead as an inhibitor to control the rate of combustion, and the balance an unsaturated organic liquid fuel of the series with the general formula $C_nH_{2n-6}$.

4. A propellant comprising a mixture of approximately eighty to ninety percent by weight of tetranitromethane as an oxidizing agent, less than one percent by weight but more than a trace of triphenyl bismuthine as an inhibitor to control the rate of combustion, and the balance an unsaturated organic liquid fuel of the series with the general formula $C_nH_{2n-6}$.

JOHN A. HANNUM.

REFERENCES CITED

The following references are of record in the file of this patent:

FOREIGN PATENTS

| Number | Country | Date |
|---|---|---|
| 26,261 | Great Britain | 1907 |
| 248,548 | Germany | Feb. 26, 1911 |

OTHER REFERENCES

Journal of American Chemical Society, vol. 51, pages 2213–2220, article by Pope et al., July 1929.

Bulletins of the American Interplanetary Society #16, February 1932, article by Lemkin, pages 8–10.

"L'Aerophile," April 1940, page 85.

"Coming Age of Rocket Power," by Pendray, 1945, page 20.

Astronautics, #26, page 6.